United States Patent [19]
Parker et al.

[11] 3,815,032

[45] June 4, 1974

[54] SELF NORMALIZING SPECTRUM ANALYZER AND SIGNAL DETECTOR

[75] Inventors: Jeffrey M. Parker, Houston, Tex.; Edward C. Dawson, Saratoga; Anthony J. Kramer, Palo Alto, both of Calif.

[73] Assignee: The United States of America as represented by the Secretary of the Air Force, Washington, D.C.

[22] Filed: June 12, 1973

[21] Appl. No.: 369,385

[52] U.S. Cl. .................................. 328/167, 328/151
[51] Int. Cl. ............................................. H03k 1/10
[58] Field of Search ............ 307/235, 241; 328/151, 328/167

[56] References Cited
UNITED STATES PATENTS

| | | | |
|---|---|---|---|
| 3,112,452 | 11/1963 | Kirkpatrick | 328/167 |
| 3,320,576 | 5/1967 | Dixon et al. | 328/167 X |
| 3,479,602 | 11/1969 | Morar | 328/167 X |
| 3,723,911 | 3/1973 | Forney | 328/167 X |

Primary Examiner—John S. Heyman
Attorney, Agent, or Firm—Harry A. Herbert, Jr.; Julian A. Siegel

[57] ABSTRACT

An analyzing system for detecting signals mixed with ambient noise. The desired signal with noise is fed to a bank of contiguously tuned filters which is followed by a bank of envelope detectors and then a bank of sample and hold circuits. A bank of comparators compare the values in the sample and hold circuits with the values in a ramp generator which is also fed to a ramp generator sample and hold circuit. The output of the comparator is summed, threshold detected, and fed to a trigger generator which triggers the ramp generator sample and hold circuit and also pulses a switching control circuit. The output of the ramp generator sample and hold circuit is scaled to become a reference signal and fed to an analog to digital converter. The outputs of the bank of sample and hold circuits are fed to a cell selector switch controlled by the switching control circuit and fed to the analog to digital converter. The switching control circuit also provides synchronizing pulses to the analog to digital converter, the bank of sample and hold circuits, and the ramp generator. The output of the analog to digital converter is averaged and threshold detected.

3 Claims, 1 Drawing Figure

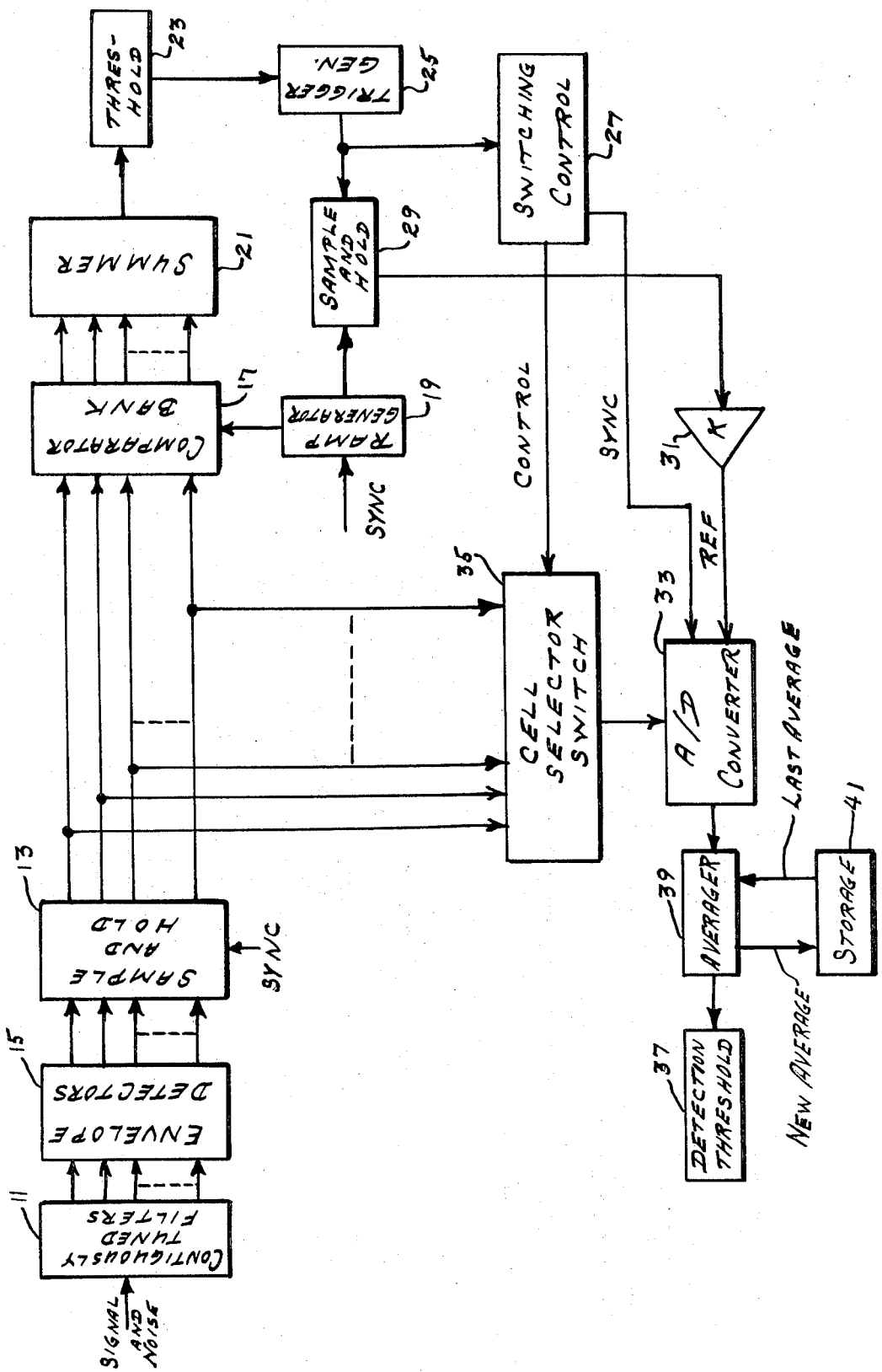

SELF NORMALIZING SPECTRUM ANALYZER AND SIGNAL DETECTOR

BACKGROUND OF THE INVENTION

This invention relates to a signal analysis, and more particularly to a coherence technique for detecting signals mixed with noise.

The present invention provides a system for the detection of signals under conditions of nonstationary and/or impulsive ambient noise. An example of circumstances requiring this capability are those functions known as spectrum surveillance, frequency management, and spectrum monitoring carried out at frequencies where the noise structure or average power level is subject to variation with time. This is the case for those frequencies where ionospheric propagation is of importance and those circumstances for which man-made noise may be a significant contribution to the ambient noise. In general, one or both of these conditions are of importance at frequencies below approximately 50 MHz. Signal detection under the conditions indicated require that provisions be made for the time variations of the ambient noise.

Three basic methods for circumventing the problems of signal detection in varying ambient noise have been used. The first uses standard automatic gain control techniques to establish receiver gain. This method is unsatisfactory in that receiver gain will be controlled by signal rather than noise energy which will deter or prevent detection of weaker signals. A second technique uses past receiver scan history to establish a threshold function for the next scan. Detection is based upon noting the difference between indicated levels for successive scans. Detection occurs if the amplitude difference between a present scanned cell amplitude and that observed on prior scans exceeds a threshold. The detection sensitivity of this technique is low since successive differences may be large due to noise alone. This requires a high threshold setting for a detection decision. A third technique is based upon signal coherence and present techniques employing this principle have several deficiencies. Major deficiencies are limitations of frequency resolution, the bandwidths of signals which can be detected, and a comparatively low sensitivity. The device to be described avoids or minimizes the deficiencies of prior art techniques.

SUMMARY OF THE INVENTION

The subject invention utilizes a technique based upon signal coherence for detecting signals under nonstationary and/or impulsive ambient noise. In this system a bank of six or more continuously tuned filters each feed a comparator through a separate envelope detector and sample and hold circuit. A ramp generator is also connected to the comparator in such a manner that the "0" level appears at those comparator outputs for which the ramp generator input voltage is less than the input from the corresponding sample and hold circuit. When the ramp generator test voltage is greater than the output of the sample and hold circuit, a corresponding "1" level appears at the output of the comparator. An analog summer, threshold and trigger circuitry results in sampling the test voltage produced by the ramp generator at the instant the voltage reaches the envelope value of a filter having the rank selected by the threshold circuit. A sample and hold circuit retains this voltage as a reference proportional to noise amplitude and this reference is then used to normalize all filter outputs which is accomplished by employing a voltage proportional to the selected reference as the reference voltage for an analog to digital converter such that the supplied reference acts as a scaling parameter. The output of the analog to digital converter consists of a digitized representation of the filter envelope values normalized by a measure of noise power.

It is therefore an object of the invention to provide a system for detecting signals in the presence of time varying ambient noise.

It is another object to provide a system for detecting signals together with noise that avoids the limitations of limited frequency resolution and low sensitivity.

These, together with other objects, features and advantages of the invention, will become more apparent from the following description taken in connection with the illustrative embodiment in the accompanying drawing.

DESCRIPTION OF THE DRAWING

The sole FIGURE is a block diagram of an embodiment of the invention.

DETAILED DESCRIPTION OF THE PREFERRED EMBODIMENT

Referring to the FIGURE, the signal analyzer includes a bank of six or more continguously tuned filters 11 each of which feeds a sample and hold circuit 13 by way of an envelope detector 15. The sample and hold circuits 13 feed one input of a like number of comparators 17. Ramp voltage generator 19 is connected to the remaining comparator inputs such that a "0" level appears at those comparator outputs for which the ramp generator input voltage is less than the input from the corresponding sample and hold circuit. The number of "1" states corresponds to the number of filter outputs with an envelope amplitude less than the test voltage produced by the ramp generator 19. Analog summer 21 sums the output of comparator bank 17 and is threshold detected in circuit 23 which controls trigger circuit 25. This results in sampling the test voltage produced by ramp generator 19 at the instant the voltage reaches the envelope value of a filter having the rank selected by the threshold circuit 23. Synchronization and control of the circuit is developed from the pulses by trigger generator 25 which is fed to switch control circuit 27. This develops the synchronization for sample and hold circuits 13 and ramp generator 19. Sample and hold circuit 29 retains the voltage selected by threshold circuit 23 as a reference proportional to noise amplitude and this reference is then used to normalize all filter outputs which is accomplished by employing a voltage proportional to the selected reference as the reference voltage for an analog to digital converter such that the supplied reference acts as a scaling parameter. The output of sample and hold circuit is first amplified by amplifier 31 having amplifying factor K and is fed to analog to digital converter 33. Also fed to analog to digital converter 33 are the selected outputs of sample and hold circuits 13. This selection is performed by cell/selector switch 35 which is controlled by switching control circuit 27. This circuit also synchronizes analog to digital converter 33. The output of analog to digital converter 33 consists of a digitized representation of the filter envelope values normalized by a measure of noise power.

Depending on sensitivity requirements signal detection may be accomplished by comparing the analog to digital converter 33 output against a fixed threshold by feeding its output to detection threshold circuit 37. Successive samples of the same frequency set may be averaged if higher sensitivity is required by feeding the output of analog to digital converter 33 to averager 39, storing in storage 41 and feeding back to averager 39, and then to detection threshold 37.

The system of the present invention minimizes desensitization by signal contamination since high ranking filter amplitudes are excluded from selection as a noise reference. Sensitivity is improved over past techniques for noise compensation because of the improvement of the noise estimate for nonstationary noise sources and because narrower bandwidths may be used by this technique than for existing coherence techniques. Resolution and signal bandwidth factors are improved over existing coherence techniques for similar reasons.

Other methods can be employed to realize the technique. For example, the required normalization can also be accomplished by an analog procedure using an analog divider. Similarly, the selection of a particular ranking amplitude can be accomplished digitally.

Variations in the basic concept, which uses an order statistic for noise estimation and normalizing, are also possible. For example, depending on the application, one can use two or more rank selected sample values to obtain a noise estimate.

What is claimed is:

1. A system for detecting a signal mixed with noise comprising:
   a. a bank of contiguously tuned filters each fed by said signal and said noise;
   b. a bank of envelope detectors fed by one each of a bank of tuned filters;
   c. a bank of envelope sample and hold circuits fed by one each of a bank of envelope detectors;
   d. a ramp generator;
   e. a bank of comparing circuits fed by the ramp generator and by one each of the bank of envelope sample and hold circuits for comparing the values of the envelope sample and hold circuits with the values of the ramp generator;
   f. means for summing the outputs of the bank of comparing circuits;
   g. a first means for detecting if the output of the summing means has reached a predetermined threshold;
   h. a trigger generator fed by the threshold detection means;
   i. a ramp generator sample and hold circuit fed by the ramp generator and the trigger generator;
   j. an analog to digital converter fed by the ramp generator sample and hold circuit;
   k. a switching control circuit fed by the trigger generator and feeding synchronizing pulses to the analog to digital converter, the envelope sample and hold circuits, and the ramp generator;
   l. a cell selector switch fed by the envelope sample and hold circuits and controlled by the switching control circuit, the cell control switch feeding the analog to digital converter; and
   m. a detector threshold circuit fed by the analog to digital converter.

2. A system for detecting a signal mixed with noise according to claim 1 which further comprises:
   a. an averaging circuit interposed between the analog to digital converter and the detection threshold circuit; and
   b. a storage fed by the averaging circuit and feeding back to the averaging circuit.

3. A system for detecting a signal mixed with noise according to claim 2 which further comprises means for scaling the output of the ramp generator sample and hold circuit interposed between the ramp generator sample and hold circuit and the analog to digital converter.

* * * * *